(12) United States Patent
Wilsak et al.

(10) Patent No.: US 7,812,206 B2
(45) Date of Patent: Oct. 12, 2010

(54) APPARATUS AND PROCESS FOR THE SEPARATION OF SOLIDS AND LIQUIDS

(75) Inventors: Richard A. Wilsak, Naperville, IL (US);
Scott A. Roberts, Naperville, IL (US);
Dean B. Comstock, Batavia, IL (US);
Ronald D. Stefanski, Aurora, IL (US)

(73) Assignee: BP Corporation North America Inc., Warrenville, IL (US)

( * ) Notice: Subject to any disclaimer, the term of this patent is extended or adjusted under 35 U.S.C. 154(b) by 1209 days.

(21) Appl. No.: 11/277,073

(22) Filed: Mar. 21, 2006

(65) Prior Publication Data

US 2007/0225539 A1   Sep. 27, 2007

(51) Int. Cl.
*B01D 37/00* (2006.01)
*C07C 7/14* (2006.01)

(52) U.S. Cl. .................. 585/814; 585/812; 210/767; 210/770; 210/771; 210/772

(58) Field of Classification Search .................. None
See application file for complete search history.

(56) References Cited

U.S. PATENT DOCUMENTS

| | | | |
|---|---|---|---|
| 1,812,773 A | 6/1931 | Cannon | |
| 2,813,781 A | 11/1957 | Mertes | |
| 3,319,437 A | 5/1967 | Goins | |
| 4,097,543 A | 6/1978 | Haag et al. | |
| 4,117,026 A | 9/1978 | Haag et al. | |
| 4,270,937 A | 6/1981 | Adler et al. | |
| 4,332,140 A | 6/1982 | Thijssen et al. | |
| 4,332,599 A | 6/1982 | Thijssen et al. | |
| 4,341,085 A | 7/1982 | Nail | |
| 4,453,959 A | 6/1984 | Bishkin | |
| 4,623,372 A | 11/1986 | Adler et al. | |
| 4,713,174 A | 12/1987 | Zievers et al. | |
| 4,734,102 A | 3/1988 | Thijssen et al. | |
| 4,735,481 A | 4/1988 | Lukas et al. | |
| 4,957,625 A | 9/1990 | Katoh et al. | |
| 5,004,860 A | 4/1991 | Hansen et al. | |
| 5,102,544 A | 4/1992 | Roodenrijs | |
| 5,292,434 A | 3/1994 | Benesi | |
| 5,329,060 A | 7/1994 | Swift | |
| 5,462,351 A | 10/1995 | Royal | |
| 5,643,468 A | 7/1997 | Ure | |
| 5,663,456 A | 9/1997 | Zhang et al. | |
| 6,521,135 B1 | 2/2003 | Benesi | |
| 2009/0197979 A1* | 8/2009 | Zhang et al. | 518/705 |

FOREIGN PATENT DOCUMENTS

DE    1 197 421    7/1965

(Continued)

*Primary Examiner*—Tam M Nguyen
(74) *Attorney, Agent, or Firm*—Robert Carpenter

(57) ABSTRACT

A filter column apparatus comprising a filtration zone and a reslurry zone. These zones are separated by a barrier wall or are in substantial cooperation with each other. Also disclosed is a process for separating at least a portion of at least one substantially solid component from a solid-liquid stream comprising the substantially solid component and at least one substantially liquid component. Also disclosed is a process for forming a substantially solids containing packed bed. Also disclosed is a process for purifying paraxylene in a filtration zone.

45 Claims, 4 Drawing Sheets

FOREIGN PATENT DOCUMENTS

| | | |
|---|---|---|
| DE | 2 921 871 | 12/1980 |
| DE | 3 211 865 | 10/1983 |
| EP | 0 175 401 | 3/1986 |
| EP | 0 398 437 | 11/1990 |
| EP | 0 497 910 | 5/1991 |
| EP | 1 352 915 | 10/2003 |
| WO | WO 2005/003594 | 4/2005 |

\* cited by examiner

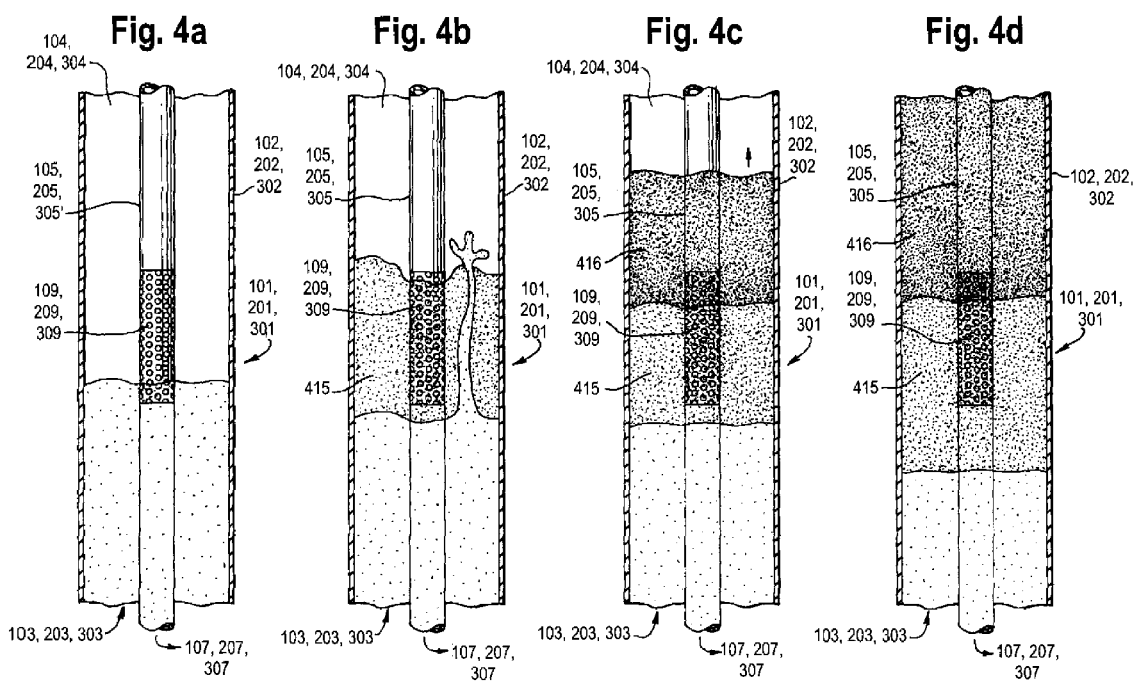

APPARATUS AND PROCESS FOR THE SEPARATION OF SOLIDS AND LIQUIDS

FIELD OF THE INVENTION

This invention relates to filter column apparatuses and processes useful for separating solids and liquids.

BACKGROUND OF THE INVENTION

In many industrial chemical processes, various separation techniques are used to isolate one material from another. These separations can be liquid from liquid or liquid from solid. Two common separation mechanisms that can be useful for chemical processes, and in particular, aromatic hydrocarbon separations, include chromatography and centrifugal force.

Chromatography has many variations and can be performed on a large scale for chemical separation or on a microscale for analytical purposes. Chromatographic methods generally rely on differences in the affinities of the various members of a group of dissolved or gaseous chemicals for a certain adsorbent. Typically, all chromatographic methods have a mobile and a stationary phase. The mixture is placed in the mobile phase that is then passed through the adsorbent-containing stationary phase. The different components of the mixture have different affinities for the adsorbent in the stationary phase, and these differences in affinities result in different rates of passage through the stationary phase, resulting in the separation.

Centrifuging is commonly used for separating solids from liquids (where one of the materials to be separated can be solidified) and for liquid from liquid mixtures. Centrifuging generally utilizes a centrifuge device that spins its contents either vertically or horizontally to increase the normal effect of gravity. In a rotating centrifuge, the denser particles will generally move to the outside of a cylinder, while the lighter particles remain near the center of that cylinder.

For many chemical processes, such solid-liquid separation methods often play an important role in the isolation and manufacture of intermediate chemical streams. The separation of aromatics, and in particular, xylene isomers are quite suitable due to advances in crystallization technology, which permits a chemical plant operator to crystallize discrete xylene isomers from a mixture of xylene isomers. Crystallization combined with efficient solid-liquid separation techniques is of interest because of the usefulness of paraxylene in the manufacture of terephthalic acid, an intermediate in the manufacture of polyester. Specifically, paraxylene having a purity of at least about 99 weight percent, more preferably at least about 99.5 weight percent, more preferably of at least about 99.7 weight percent, is most suitable for the manufacture of terephthalic acid by the oxidation of paraxylene.

Current commercial processes for separating xylene isomers include the aforementioned chromatography, and crystallization followed by centrifugation. Crystallization, rather than distillation, is typically a more suitable option to separate xylene isomers due to the fact that their respective freezing points are far apart, while their boiling points are in close proximity. For example, pure paraxylene freezes at 56° F., pure metaxylene freezes at −54° F., pure orthoxylene freezes at −13° F., and pure ethylbenzene freezes at −139° F. Equilibrium mixtures of xylene isomers generally contain about 25 weight percent paraxylene, about 25 weight percent orthoxylene, and about 50 weight percent metaxylene.

Due to the low concentration of paraxylene in these mixed xylene streams and the disparate freezing points of the xylene isomers, very low temperatures are generally required to ensure maximum recovery of paraxylene from a $C_8$ fraction by crystallization. However, there is an operational low temperature limit generally taken as the metaxylene/paraxylene or the orthoxylene/paraxylene binary eutectic temperature that prevents the complete recovery of all the paraxylene from a $C_8$ fraction.

At or below this limit, either metaxylene or orthoxylene will co-crystallize with paraxylene. Furthermore, if the temperature falls below either of the binary eutectic temperatures, then a second solid phase which is lean in paraxylene will crystallize from the mixture. The formation of a second solid phase is generally viewed as undesirable, so crystallization processes are typically operated at as cold a temperature as possible, but at a temperature warmer than the warmest binary eutectic temperature. While this constrains the once-through paraxylene recovery of the process, conventional paraxylene separation processes that use crystallization produce a substantially pure paraxylene product.

Although such crystallization processes produce a paraxylene product with a purity level in excess of 98 percent, the use of centrifuges, centrifuge-like devices, and other solid-liquid separation devices can add significant costs to the purification process due to their high capital costs and the high maintenance costs inherent in high speed rotating parts. In addition, such devices are expensive to buy, install, operate, and maintain. They are also a reliability problem since even well-maintained centrifuges are apt to shut down unexpectedly. As a result, prior efforts have focused on developing alternatives to centrifugation to improve the economics of producing substantially pure paraxylene.

U.S. Pat. Nos. 4,734,102 and 4,735,781, issued to Thijssen et al. disclose solid-liquid separation processes and apparatuses that function with minimal moving parts. The process and apparatus of Thijssen '102 and '781 utilize a closed column having at least one filter tube having a filter. A suspension is directed into one end of the column, and a washing liquid into a second end of the column in countercurrent flow to the suspension, forming a bed in the column. A filtrate stream from the suspension is removed through the filters of the filter tubes into the interior of the tubes, and a concentrated suspension is withdrawn from the second end of the column. A wash liquid is introduced at the second end to wash and reslurry the concentrated suspension. When the process is used to separate a suspension derived from a melt crystallization process, the wash liquid comprises molten crystal product from the suspension.

Although the processes and apparatuses disclosed in Thijssen '102 and '781 avoid centrifuging, these processes have disadvantages that have limited their broad application.

The process disclosed in the Thijssen patents cannot effectively separate liquids from solids at processing temperatures far below the melting point of slurry crystals derived from a melt crystallization process. This is because the wash liquid utilized during the process freezes within the column during the washing part of the process. At increasingly lower temperatures, the freezing wash liquid fills a larger portion of the void fraction between the solids, thereby requiring higher and higher pressures to drive the wash liquid into the column. Eventually, a low enough temperature will be reached wherein the freezing wash liquid essentially plugs the device, causing failure and imminent shutdown of the apparatus and process disclosed in the Thijssen patents. In the case of the separation of paraxylene from xylene isomers, the application of this technology would preclude the manufacturer from operating its crystallization process at aggressively low crystallization temperatures so as to maximize paraxylene recovery by challenging the binary eutectic temperatures described above.

Yet another disadvantage is that the use of a molten solids wash liquid in the process disclosed in the Thijssen patents can contaminate the filtrate with a liquid that may not be easily or inexpensively separated from the filtrate. This can result in a substantial loss of solid product to the filtrate.

Consequently, there is still a great need in the industry for alternative processes and apparatuses for separation of solids from liquids that address and solve the problems noted above.

It has now been found that filter column apparatuses in accordance with the present invention and comprising a filtration zone and a reslurry zone substantially separated by a barrier wall provides substantial energy and capital savings benefits over apparatuses that do not feature such a barrier wall.

It has also been found that a filter column apparatus comprising a filtration zone and a reslurry zone in substantial cooperation with one another provides for substantial energy and capital savings over apparatuses where reslurry operations occur in separate downstream vessels.

It has also been found that processes for separating at least a portion of one or more substantially solid components from a solid-liquid stream, in a filtration zone, by contacting at least a portion of the substantially solid components and/or the solid-liquid stream with an immiscible fluid, such as a gas, produces a relatively dry and pure product stream of substantially solid components.

It has also been found that processes for purifying paraxylene from a solid-liquid stream having a wide range of temperatures, in a filtration zone, by contacting at least a portion of either substantially solid paraxylene or said solid-liquid stream with an immiscible fluid, such as a gas, in lieu of a wash liquid, produces a relatively dry and pure product stream comprising substantially solid paraxylene, which can be further processed with little or no additional refrigeration costs.

SUMMARY OF THE INVENTION

One aspect of this invention is a filter column apparatus comprising a filtration zone and a substantially enclosed reslurry zone. The filtration zone and substantially enclosed reslurry zones are separated by a barrier wall.

Another aspect of this invention is a filter column apparatus comprising a substantially enclosed filtration zone and a reslurry zone. The substantially enclosed filtration zone and said reslurry zone are separated by a barrier wall.

Another aspect of this invention is a filter column apparatus comprising a filtration zone and a reslurry zone. The filtration zone and said reslurry zone are in substantial cooperation with one another.

Another aspect of this invention is a process for separating at least a portion of one or more substantially solid components from a solid-liquid stream comprising said substantially solid components and one or more substantially liquid components. The process comprises contacting at least a portion of the solid-liquid stream, and/or at least a portion of the substantially solid component, with an immiscible fluid, and passing at least a portion of said substantially liquid component and at least a portion of said immiscible fluid through at least one filter and forming a filtrate. The process further comprises removing an enriched product stream comprising the substantially solid components. The process takes place in a filtration zone comprising at least one filter, an area of higher concentration of substantially solid components, and an area of lower substantially solid components. The filtration zone may also comprise at least one filter, a higher pressure zone, and a lower pressure zone.

Another aspect of this invention is a packed bed process for separating at least a portion of a substantially solid component from a solid-liquid stream comprising said substantially solid component and at least one substantially liquid component. The process comprises applying an immiscible fluid for assisting formation of a substantially solids containing packed bed, further defining bed void space. The process further comprises passing at least a portion of the substantially liquid component through the bed void space of the substantially solids containing packed bed, thus leaving an enriched product stream comprising said at least one substantially solid component.

Another aspect of this invention is a start up process for forming a substantially solids containing packed bed. The process comprises contacting a solid-liquid stream comprising at least one substantially solid component and at least one substantially liquid component with an immiscible fluid, and directing at least a portion of said at least one substantially liquid component through at least one filter to form said substantially solids containing packed bed, wherein said bed further defines a bed void space. The process further comprises passing at least a portion of said at least one substantially liquid component through said bed void space of substantially solids containing packed bed.

Another aspect of this invention is a process for separating at least a portion of substantially solid paraxylene from a solid-liquid stream comprising said substantially solid paraxylene and a substantially liquid aromatics stream. The process comprises contacting an immiscible fluid with one or both of said solid-liquid stream, or at least a portion of said substantially solid paraxylene. The process further comprises passing at least a portion of said substantially liquid aromatics stream, and at least a portion of said immiscible fluid through at least one filter and forming a filtrate comprising said substantially liquid aromatics stream and said immiscible fluid, thus leaving an enriched product stream comprising said substantially solid paraxylene. This enriched product stream is reslurried with a flush feed and further processed to produce a purified, paraxylene product. The process occurs in a filtration zone comprising at least one filter, an area of higher concentration of substantially solid paraxylene, and an area of lower concentration of substantially solid paraxylene. The filtration zone may also comprise at least one filter, a higher pressure zone, and a lower pressure zone.

BRIEF DESCRIPTION OF THE DRAWINGS

FIGS. 4a-d depict a cross-sectional view of a start-up procedure for a filter column and filtration process in accordance with the subject invention.

DETAILED DESCRIPTION OF THE INVENTION

Figure 1:
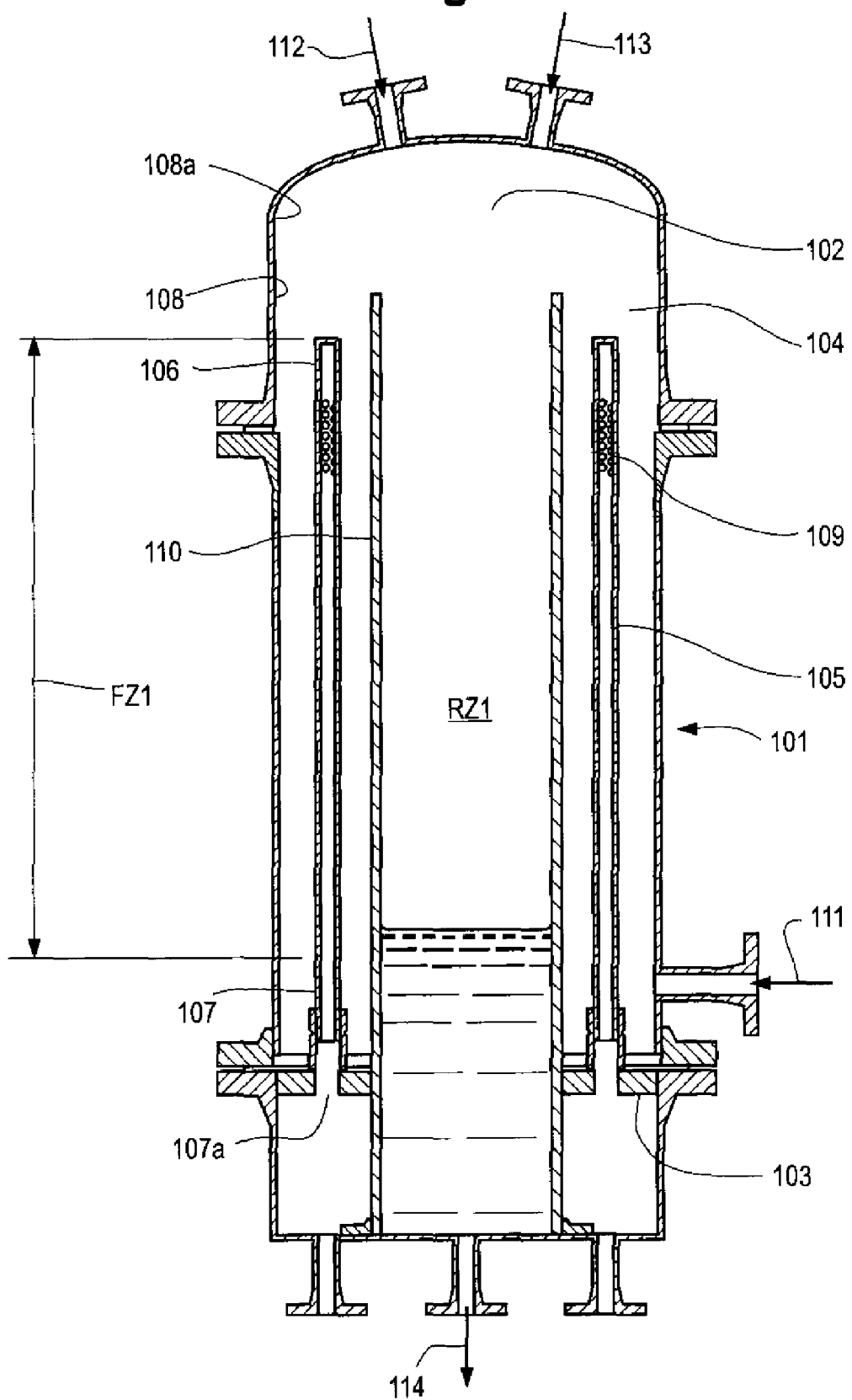
FIG. 1 depicts a cross-sectional view of a filter column apparatus with a substantially enclosed reslurry zone.

The application of filter columns in the present invention, as described in more detail below, can be used in processes to separate at least one substantially solid component from a solid-liquid stream comprising the substantially solid component and at least one substantially liquid component. As used herein, the recitations of "substantially solid component" and "substantially liquid component" shall refer to at least one substantially solid component or at least one substantially liquid component, or similarly, one or more substantially solid components, or one or more substantially liquid components. Preferably, this invention provides for the application of filter columns at the intermediate steps of such solid-liquid separation processes to assist in the efficient and effective recovery of purified paraxylene.

The solid-liquid stream used in this invention is generally a mixture of a substantially solid component and a substantially liquid component. Suitable solid-liquid streams comprise between from about 0.5 weight percent to about 65 weight percent of a substantially solid component, from about 5 weight percent to about 60 weight percent of a substantially solid component, and more preferably between about 10 weight percent to about 55 weight percent of a substantially solid component for best results. For aromatic crystallization processes, such a substantially solid component often comprises substantially solid paraxylene. Optionally, this substantially solid component may comprise small amounts of orthoxylene, metaxylene, ethylbenzene, and other hydrocarbons such as paraffins, naphthenes, benzene, and toluene. Such a solid-liquid stream may also comprise between about 35 weight percent to about 95 weight percent of a substantially liquid component, between about 45 weight percent to about 90 weight percent of a substantially liquid component, and more preferably between about 40 weight percent to about 85 weight percent of a substantially liquid component. For aromatics crystallization processes, the substantially liquid component often comprises paraxylene, metaxylene, orthoxylene, ethylbenzene, and other hydrocarbons, such as paraffins, naphthenes, benzene, and toluene.

Preferably, solid-liquid streams utilized in this invention arise from, or are the direct or indirect product or byproduct of, processes which produce, contain, or recover paraxylene. Streams from which paraxylene is recovered are often derived from catalytic reforming processes found in many petroleum refineries. Other streams containing paraxylene include pyrolysis gasoline, conventional toluene disproportionation products, and conventional transalkylation products.

In many of the above-mentioned streams, the xylene isomers are generally near their equilibrium distribution, which is about 25% paraxylene, about 50% metaxylene, and about 25% orthoxylene. The low equilibrium concentration of paraxylene is further diluted by the presence of ethylbenzene, such that the $C_8$ fraction derived by distillation from reformate typically comprises from about 10 to about 20 weight percent ethylbenzene, and more typically from about 15 to about 18 weight percent ethylbenzene. Furthermore, the presence of other compounds such as benzene, toluene, and other hydrocarbons such as paraffins and naphthenes also lower the paraxylene concentration. The $C_8$ fraction of pyrolysis gasoline typically comprises as much as about 30 to about 60 weight percent ethylbenzene, whereas the $C_8$ fraction of conventional toluene disproportionation typically comprises only about 2 to about 7 weight percent ethylbenzene. Dilution by ethylbenzene and other compounds and the equilibrium distribution of the xylene isomers reduces the paraxylene content of these streams to as low as about 10 to about 25 weight percent paraxylene, with reformate mixed xylene streams typically comprising about 15 to about 20 weight percent paraxylene. These streams may be preprocessed to selectively remove metaxylene or orthoxylene, which would increase the paraxylene concentration. Thus, streams with relatively lower paraxylene concentrations as described above generally comprise less than about 50 weight percent paraxylene, typically less than about 35 weight percent paraxylene, and more typically less than about 25 weight percent paraxylene.

Streams with relatively higher paraxylene concentrations (relative to the aforementioned streams) arise from sources including streams produced by selective toluene disproportionation (STDP), selective alkylation, selective transalkylation, as described in U.S. Pat. No. 4,097,543 and U.S. Pat. No. 4,117,026, and in W. W. Kaeding, et al., J. Catal., 67, 159 (1981), or intra-stage products of paraxylene recovery processes as found in the second or subsequent stages of multi-stage crystallization processes. Other streams with relatively higher paraxylene concentration also include the paraxylene-enriched stream produced in the selective adsorption zone of a hybrid adsorption/crystallization paraxylene process, such as that described in U.S. Pat. No. 5,329,060.

Paraxylene recovery processes are often based on crystallization or selective adsorption technology. Briefly, paraxylene crystallization processes generally comprise an isomerization section, a fractionation section, and a crystallization section. Some crystallization processes may also comprise slurry sections. Such crystallization processes may include one or more crystallization stages which generally comprise jacketed crystallizers, which are typically scraped wall vessels with refrigerated jackets through which a vaporizing refrigerant passes. Crystallization processes tend to be most suitable for use with the present invention because they separate and purify through the production of solids.

An example of a molecular sieve adsorption process would be "Parex." "Parex" is a commonly applied molecular sieve adsorption process, as described in D. P. Thornton, Hydrocarbon Proc. 49 (1970) at pp. 151-155, which is incorporated herein by reference. This process is based on the principle of continuous selective adsorption in the liquid phase employing fixed beds of solid adsorbent. The adsorbent is made from a zeolite, and the separation technique is based on small differences in affinity to the adsorbent. Paraxylene has the strongest affinity to the adsorbent and is thus preferentially adsorbed.

In so far that such processes generate solid-liquid streams comprising substantially solid paraxylene, this invention provides for the application of filter columns at the intervening steps of such processes to assist in the efficient and effective recovery of a purified paraxylene product.

FIG. 1 depicts a cross-sectional view of a filter column apparatus with a substantially enclosed reslurry zone, RZ1. In FIG. 1, filter column 101 comprises a substantially hollow cavity 102 having a substantially closed end 103 and a substantially open end 104. The filter column 101 can be substantially tubular or substantially cylindrical in shape. Within the substantially hollow cavity 102, at least one filter tube 105 extends in an axial direction, with at least one filter tube 105 having a top portion 106 and a bottom portion 107. As used herein, the recitations of "filter tube" shall refer to at least one filter tube. The top portion 106 of filter tube 105 is closed.

The filter tube 105 is generally situated in substantial proximity to an inner wall 108 inside of filter column 101. The inner wall 108 is also generally situated in substantial proximity to a barrier wall 110, which is also located inside filter column 101. Preferably, filter tube 105 is situated substantially between said barrier wall 110 and said inner wall 108. The bottom portion 107 of filter tube 105 extends through the substantially closed end 103 of the substantially hollow cavity 102, with the bottom portion 107 of the filter tube 105 having an opening 107a at a terminal end. Such an opening may provide for the passage of substantially liquid component, or an immiscible fluid (described hereafter), either individually or in combinations thereof. The filter tube 105 comprises at least one filter 109, attached, integrated, or otherwise affixed to the filter tube 105, forming a connection for flow of substantially liquid component or an immiscible fluid, either individually or in combinations thereof, between the interior of the substantially hollow cavity 102 and the interior of filter tube 105. Optionally, the filter 109 may be attached, integrated, or otherwise affixed to barrier wall 110 and/or inner wall 108. As used herein, the recitations of "filter" shall refer to at least one filter.

In FIG. 1, the area surrounding or outside of filter 109, or optionally the area surrounding or outside of filter tube 105 describes an area of higher concentration of the substantially solid component (higher concentration zone). Alternatively, this area also describes an area of higher pressure (higher pressure zone). The area within or inside of filter 109, or optionally the area within or inside of filter tube 105 describes an area of lower concentration of the substantially solid component (lower concentration zone). Alternatively, this area also describes an area of lower pressure (lower pressure zone). These areas generally at, near, or in substantial proximity to filter 109, or optionally at, near, or in substantial proximity to filter tube 105 describe a filtration zone. The filtration zone of this embodiment is subsequently referred to herein as FZ1.

The area of higher concentration of the substantially solid component has a greater weight percent of the substantially solid component than the area of lower concentration of the substantially solid component. This concentration differential can be measured by any means suitable to demonstrate a concentration gradient across filter 109 in the filtration zone FZ1. For example, the concentration of the substantially solid component in the area of higher concentration of the substantially solid component can be determined by measuring the weight percent of the substantially solid component in the solid-liquid stream directed into the area of higher concentration of the substantially solid component. Likewise, the concentration of the substantially solid component in the area of lower concentration of the substantially solid component can be determined by measuring the weight percent of the substantially solid component in a filtrate withdrawn from the filter column at 114.

Alternatively, as stated, the filtration zone FZ1 can be defined by an area of higher pressure (a higher pressure zone) and an area of lower pressure (a lower pressure zone), wherein said areas are separated by filter 109. The area of higher pressure is at a higher pressure than the area of lower pressure, and this pressure differential can be measured by any means suitable to demonstrate a pressure gradient across filter 109 in the filtration zone FZ1. For example, the pressure level in the area of higher pressure can be determined by measuring the pressure of the solid-liquid stream directed into the area of higher pressure, and the pressure level of the area of lower pressure can be determined by measuring the pressure of the substantially liquid component comprising filtrate withdrawn from the filter column 101. Additionally, fluids flow from the area of high pressure to the area of low pressure. Thus, the flow of the substantially liquid component portion of the solid-liquid stream through filter 109 indicates a pressure differential between the area of higher pressure and the area of lower pressure across the filter 109.

Filter column 101 further comprises a substantially curved section of inner wall 108 through which the open end 104 of the substantially hollow cavity 102 is exposed. Such substantially curved section is depicted as 108a. At or near the closed end 103 of the substantially hollow cavity 102, there is preferably at least one solid-liquid stream inlet 111 to direct a solid-liquid stream into the substantially hollow cavity 102. Filter column 101 further may comprise at least one immiscible fluid inlet line 112 to direct an immiscible fluid into the substantially hollow cavity 102.

Such an immiscible fluid is used to displace the substantially liquid component from the solid-liquid stream, or to form a blanket within at least a portion of substantially hollow cavity 102. For FIGS. 1-3, inclusively, the immiscible fluid is preferably a gas. Non-limiting examples of such a gas include nitrogen, carbon dioxide, compressed air, hydrogen, helium, xenon, argon, neon, methane, ethane, natural gas or steam. Optionally, the immiscible fluid may also be a liquid, substantially insoluble in the substantially solid component of said solid-liquid stream. If a liquid, the immiscible fluid is also substantially insoluble in the substantially liquid component of the solid-liquid stream, allowing for relatively easy subsequent separation of the immiscible fluid from the filtrate. Optionally, the immiscible fluid may also be a supercritical fluid.

Figure 2:
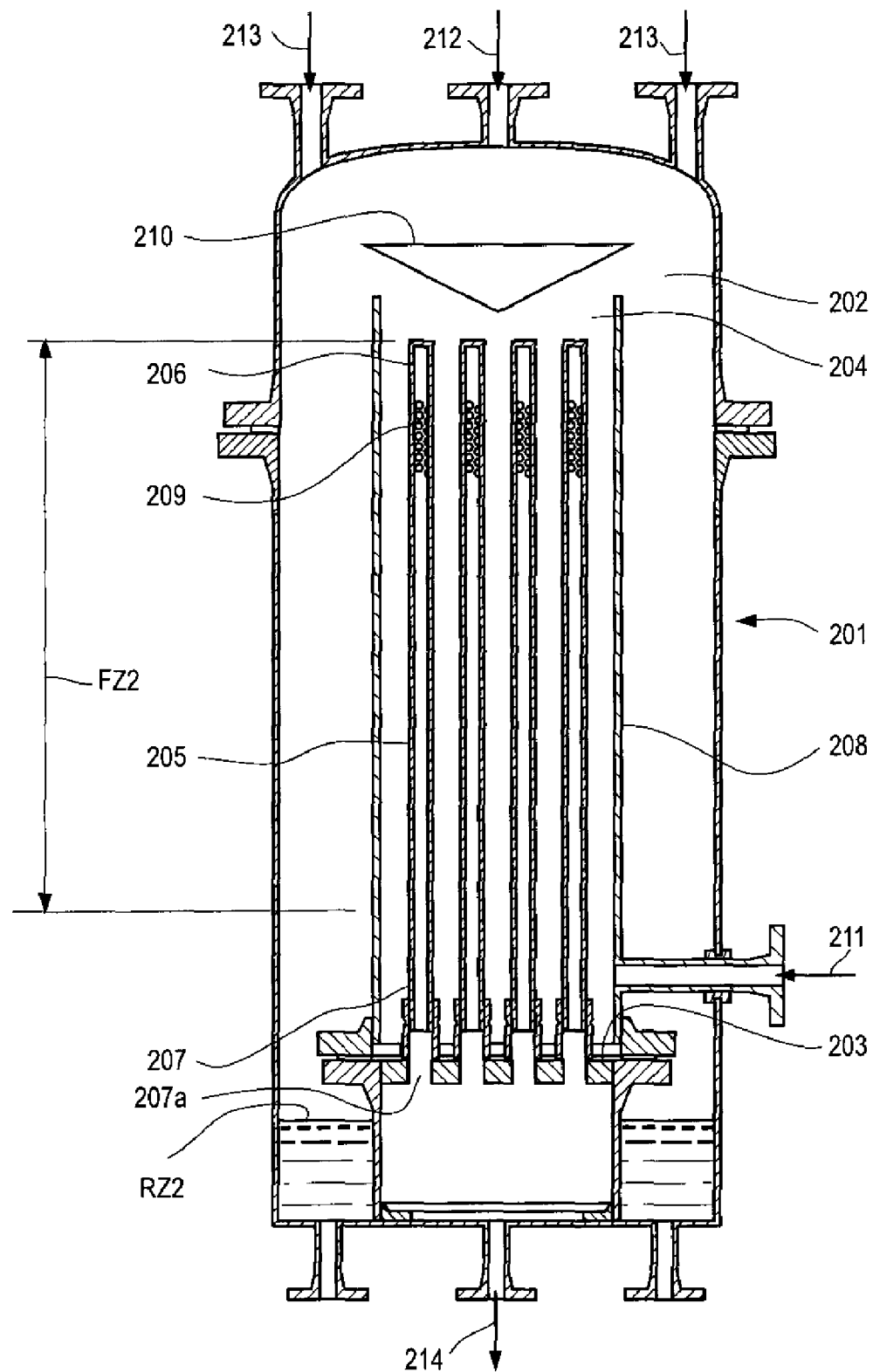
FIG. 2 depicts a cross-sectional view of a filter column apparatus with a substantially enclosed filtration zone.
Figure 3:
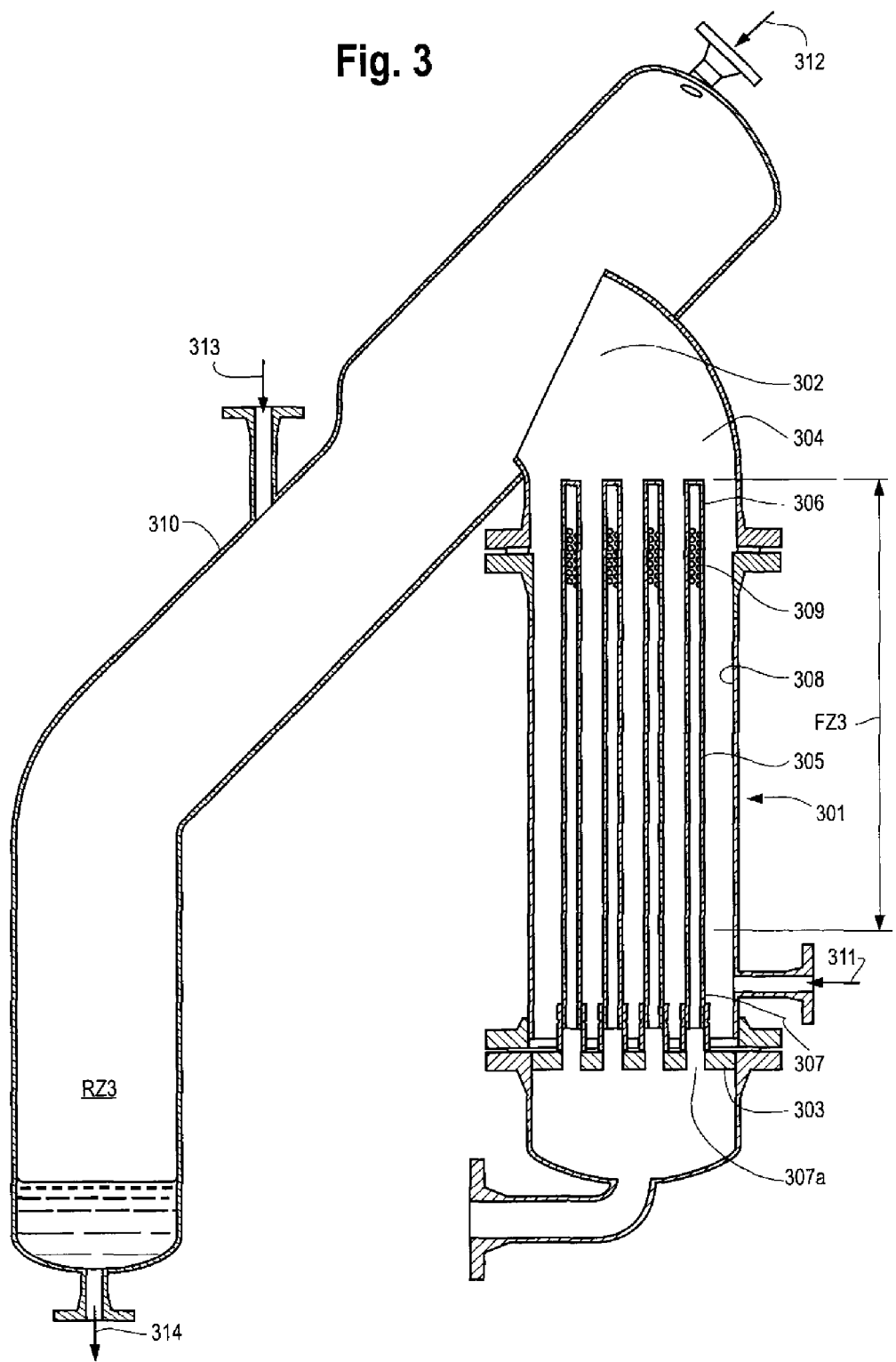
FIG. 3 depicts a cross-sectional view of a filter column in substantial cooperation with a chute.

For FIGS. 1-3, inclusively, the immiscible fluid can be provided at any temperature suitable for separating the substantially liquid component from the substantially solids component from a particular solid-liquid stream. Preferably, the immiscible fluid is at a temperature lower than the temperature of the solid-liquid stream. The lower temperature of the immiscible fluid can be utilized to further crystallize at least a portion of the substantially liquid component or maintain the substantially solid component in the solid-liquid stream, thus providing for improved solids recovery. Alternatively, the immiscible fluid can be provided at a higher temperature than the temperature of the solid-liquid stream. The higher temperature of the immiscible fluid can be utilized to facilitate the removal of residual substantially liquid component from the substantially solid component, producing a remaining enriched product stream comprising the substantially solid component. Yet alternatively, the temperature of the immiscible fluid is about the same as the temperature of the solid-liquid stream in order to practice the process under substantially isothermal conditions. Optionally, if the immiscible fluid is a gas and the amount of gas is small compared to the amount of the substantially solid component in the solid-liquid stream, the temperature of the immiscible fluid is relatively irrelevant, as the amount of energy introduced to the device by the gas is insignificant and the unit operates at substantially isothermal conditions over a wide range of gas temperatures.

Filter column 101 may further comprise at least one line to direct a flush feed 113 into said substantially hollow cavity 102 to clear any obstructions such as packed, substantially solid component lodged in the substantially hollow cavity 102. Such a flush feed can be any gas or liquid capable of clearing the filter column of obstructions. Typically, the flush feed may comprise an inert gas, including, but not limited to, nitrogen or carbon dioxide. Alternatively, the flush feed comprises air or hydrogen. Yet alternatively, the flush feed may comprise at least a portion of the substantially liquid component comprising a filtrate produced during the process either according to this invention or from a conventional solid-separation device, such as a centrifuge. In the case of separating paraxylene crystals from a solid-liquid of mixed xylenes, the flush feed preferably comprises $C_8$ aromatics.

Within the filter column 101 lays reslurry zone, RZ1. An enriched product stream comprising the substantially solid component is separated in and directed from the filtration zone, FZ1, into the reslurry zone, RZ1. At this point, the enriched product stream comprising the substantially solid component is in the form of a relatively dry cake when utilizing a gaseous immiscible fluid. The enriched product stream comprising the substantially solid component is reslurried with flush feed 113. The slurry mixture of flush feed 113 and the enriched product stream comprising the substantially solid component in reslurry zone RZ1 may optionally be agitated. The reslurry zone RZ1 preferably has a liquid level, as depicted in FIG. 1, to prevent and seal against the escape of immiscible fluid out of the reslurry zone along with effluent stream 114, which comprises a mixture of flush feed 113 and the enriched product stream comprising the substantially solid component. The reslurry zone RZ1 may further comprise a straining means to assist with the reslurry of the enriched product stream comprising the substantially solid component with flush feed 113, Optionally, a heat source, in lieu of the flush feed 113, may be incorporated into the reslurry zone to melt at least a portion of the enriched product stream comprising the substantially solid component.

The reslurry zone RZ1 is operated at a sufficiently high temperature so that the resulting effluent stream 114 from the reslurry zone can be sent to one or more solid-liquid separation devices (not shown) that are capable of producing more enriched substantially solid component, which is further processed using conventional techniques to eventually recover a purified, paraxylene product. Such a purified paraxylene product comprises at least about 99 weight percent paraxylene, more preferably at least about 99.5 weight percent paraxylene, and yet more preferably at least about 99.7 weight percent paraxylene. Such solid-liquid separation devices are well-known in the art, and include, but are not limited to, solid bowl, screen bowl or pusher type centrifuges and combinations thereof, wash columns, or rotary filters. Alternatively, the effluent stream 114 could be sent to another filter column.

The reslurry zone RZ1 and the filtration zone FZ1 are separated by a barrier wall 110. In this embodiment, the barrier wall 110 substantially encloses the reslurry zone RZ1 from the filtration zone FZ1. The barrier wall also has thermal insulation properties which keeps the filtration zone FZ1 relatively cool and the reslurry zone RZ1 relatively warm. In addition, the filtration zone FZ1 is annularly disposed around said substantially enclosed reslurry zone RZ1, as separated by said barrier wall. Both the reslurry zone RZ1 and the filtration zones FZ1 are configured within filter column 101 with each zone defining its own substantially central axis within each respective zone. In addition, the substantially central axis of the reslurry zone RZ1 and that of the filtration zone FZ1 are in substantial proximity to each other.

FIG. 2 shows a cross-sectional view of a filter column apparatus with a substantially enclosed filtration zone. Referring to FIG. 2, a filter column 201 comprises a substantially hollow cavity 202 having a closed end 203 and an open end 204. The filter column 201 can be substantially tubular or cylindrical in shape. Within the substantially hollow cavity 202, at least one filter tube 205 extends in an axial direction, with the at least one filter tube 205 having a top portion 206 and a bottom portion 207. The top portion 206 of filter tube 205 is closed.

The filter tube 205 is generally situated in substantial proximity to a barrier wall 208 inside of said filter column 201. The bottom portion 207 of filter tube 205 extends through the closed end 203 of the substantially hollow cylinder 202, with the bottom portion 207 having an opening 207a at a terminal end. The filter tube 205 comprises at least one filter 209, attached, integrated, or otherwise affixed to filter tube 205, forming a connection for flow of substantially liquid component or an immiscible fluid, either individually or in combinations thereof, between the interior of the substantially hollow cavity 202 and the interior of filter tube 205. Optionally, filter 209 may be attached, integrated, or otherwise affixed to barrier wall 208.

In FIG. 2, the area surrounding or outside of filter 209, or optionally the area surrounding or outside of filter tube 205 describes an area of higher concentration of the substantially solid component (higher concentration zone). Alternatively, this area also describes an area of higher pressure (higher pressure zone). The area within or inside of filter 209, or optionally the area within or inside of filter tube 205 describes an area of lower concentration of the substantially solid component (lower concentration zone). Alternatively, this area also describes an area of lower pressure (lower pressure zone). These areas generally at, near, or in substantial proximity to filter 209, or optionally at, near, or in substantial proximity to filter tube 205 describe a filtration zone. The filtration zone of this embodiment is subsequently referred to herein as FZ2.

The area of higher concentration of the substantially solid component has a greater weight percent of the substantially solid component than the area of lower concentration of the substantially solid component. This concentration differential can be measured by any means suitable to demonstrate a concentration gradient across filter 209 in the filtration zone FZ2. For example, the concentration of the substantially solid component in the area of higher concentration of the substantially solid component can be determined by measuring the weight percent of the substantially solid component in the solid-liquid stream directed into the area of higher concentration of the substantially solid component. Likewise, the concentration of the substantially solid component in the area of lower concentration of the substantially solid component can be determined by measuring the weight percent of the substantially solid component in a filtrate withdrawn from the filter column at 214.

Alternatively, as stated, the filtration zone FZ2 can be defined by an area of higher pressure (a higher pressure zone) and an area of lower pressure (a lower pressure zone), wherein said areas are separated by filter 209. The area of higher pressure is at a higher pressure than the area of lower pressure, and this pressure differential can be measured by any means suitable to demonstrate a pressure gradient across filter 209 in the filtration zone FZ2. For example, the pressure level in the area of higher pressure can be determined by measuring the pressure of the solid-liquid stream directed into the area of higher pressure, and the pressure level of the area of lower pressure can be determined by measuring the pressure of the substantially liquid component comprising filtrate withdrawn from the filter column 201. Additionally, fluids flow from the area of high pressure to the area of low pressure. Thus, the flow of the substantially liquid component portion of the solid-liquid stream through filter 209 indicates a pressure differential between the area of higher pressure and the area of lower pressure across the filter 209.

Filter column 201 also contains a deflector 210 inside said filter column 201 through which the open end 204 of the substantially hollow cavity 202 is exposed. The deflector 210 is used to deflect an enriched product stream comprising the substantially solid component from the filter tube 205 towards a reslurry zone RZ2. The reslurry zone of FIG. 2 functions in the same manner as described for FIG. 1.

At or near the closed end 203 of the substantially hollow cavity 202, it is preferred that there is at least one solid-liquid feed inlet 211 to direct a solid-liquid stream into the substantially hollow cavity 202. Filter column 201 further may comprise at least one immiscible fluid inlet line 212 to direct an immiscible fluid preferably into the substantially hollow cavity 202. Such an immiscible fluid is used to displace the substantially liquid component from the solid-liquid stream, or to form a blanket within at least a portion of the substantially hollow cavity 202. Filter column 201 may further comprise at least one line to direct a flush feed 213 into said substantially hollow cavity 202 to clear any obstructions such as packed, substantially solid component lodged in the substantially hollow cavity 202. The flush feed functions in the same manner as described for FIG. 1.

The reslurry zone RZ2 and the filtration zone FZ2 are separated by barrier wall 208. The barrier wall 208 substantially encloses the reslurry zone RZ2 from the filtration zone FZ2. The barrier wall also has thermal insulation properties which keeps the filtration zone FZ2 relatively cool and the reslurry zone RZ2 relatively warm. In addition, the reslurry zone RZ2 is annularly disposed around said substantially enclosed filtration zone FZ2, as separated by said barrier wall. Both the reslurry zone RZ2 and the filtration zone FZ2 are configured within filter column 201, with each zone defining its own substantially central axis within each respective zone. In addition, the substantially central axis of both the reslurry zone RZ2 and filtration zone FZ2 are in substantial proximity to each other.

Within the filter column 201 lays reslurry zone RZ2, wherein an enriched product stream comprising the substantially solid component is directed from the filtration zone, FZ2. At this point, the enriched product stream comprising the substantially solid component is in the form of a relatively dry cake when utilizing a gaseous immiscible fluid. The enriched product stream comprising the substantially solid component is reslurried with flush feed 213. The slurry mixture of flush feed 213 and the enriched product stream comprising the substantially solid component in reslurry zone RZ2 may optionally be agitated. The reslurry zone RZ2 preferably has a liquid level, as depicted in FIG. 2, to prevent and seal against the escape of immiscible fluid out of the reslurry zone along with effluent stream 214, which comprises a mixture of flush feed 213 and the enriched product stream comprising the substantially solid component. The reslurry zone RZ2 may further comprise a straining means to assist with the reslurry of the enriched product stream comprising the substantially solid component with flush feed 213. Optionally, a heat source, in lieu of the flush feed 213, may be incorporated into the reslurry zone to melt at least a portion of the enriched product stream comprising the substantially solid component.

The reslurry zone RZ2 is preferably operated at a sufficiently high temperature so that the resulting effluent stream 214 from the reslurry zone can be sent to one or more solid-liquid separation devices (not shown) that are capable of producing more enriched substantially solid components, which are further processed using conventional techniques to eventually recover a purified, paraxylene product. Such a purified paraxylene product comprises at least about 99 weight percent paraxylene, more preferably 99.5 weight percent paraxylene, and yet more preferably at least about 99.7 weight percent paraxylene. Such solid-liquid separation devices are well-known in the art, and include, but are not limited to, solid bowl, screen bowl or pusher type centrifuges and combinations thereof, wash columns, or rotary filters. Alternatively, the effluent stream 214 could be sent to another filter column.

FIG. 3 depicts a cross-sectional view of a filter column in substantial cooperation with a chute 310. "Substantial cooperation" as used herein means more than one vessel attached, integrated, affixed, or otherwise associated with one another. Referring to FIG. 3, a filter column 301 comprises a substantially hollow cavity 302 having a closed end 303 and an open end 304. The filter column 301 can be substantially tubular or cylindrical in shape. Within the substantially hollow cavity 302, at least one filter tube 305 extends in an axial direction, with at least one filter tube 305 having a top portion 306 and a bottom portion 307. The top portion 306 of filter tube 305 is closed. The filter tube 305 is generally situated in substantial proximity to an inner wall 308 of said filter column 301. The bottom portion 307 of filter tube 305 extends through the closed end 303 of the substantially hollow cylinder 302, the bottom portion 307 having an opening 307a at a terminal end. Filter tube 305 comprises at least one filter 309, attached, integrated, or otherwise affixed to at least one filter tube 305, forming a connection for flow of substantially liquid component or an immiscible fluid, either individually or in combinations thereof, between the interior of the substantially hollow cavity 302 and the interior of filter tube 305. Optionally, the filter 309 may be attached, integrated, or otherwise affixed to inner wall 308.

In FIG. 3, the area surrounding or outside of filter 309, or optionally the area surrounding or outside of filter tube 305 describes an area of higher concentration of the substantially solid component (higher concentration zone). Alternatively, this area also describes an area of higher pressure (higher pressure zone). The area within or inside of filter 309, or optionally the area within or inside of filter tube 305 describes an area of lower concentration of substantially solid component (lower concentration zone). Alternatively, this area also describes an area of lower pressure (lower pressure zone). These areas generally at, near, or in substantial proximity to filter 309, or optionally at, near, or in substantial proximity to filter tube 305 describe a filtration zone. The filtration zone of this embodiment is subsequently referred to herein as FZ3. The filtration zone FZ3 is configured within filter column 301 as being defined around a substantially central axis.

The area of higher concentration of the substantially solid component has a greater weight percent of the substantially solid component than the area of lower concentration of the substantially solid component. This concentration differential can be measured by any means suitable to demonstrate a concentration gradient across filter 309 in the filtration zone FZ3. For example, the concentration of the substantially solid component in the area of higher concentration of the substantially solid component can be determined by measuring the weight percent of the substantially solid component in the solid-liquid stream directed into the area of higher concentration of the substantially solid component. Likewise, the concentration of the substantially solid component in the area of lower concentration of the substantially solid component can be determined by measuring the weight percent of the substantially solid component in a filtrate withdrawn from the filter column at 314.

Alternatively, as stated, the filtration zone FZ3 can be defined by an area of higher pressure (a higher pressure zone) and an area of lower pressure (a lower pressure zone), wherein said areas are separated by filter 309. The area of higher pressure is at a higher pressure than the area of lower pressure, and this pressure differential can be measured by any means suitable to demonstrate a pressure gradient across filter 309 in the filtration zone FZ3. For example, the pressure level in the area of higher pressure can be determined by measuring the pressure of the solid-liquid stream directed into the area of higher pressure, and the pressure level of the area of lower pressure can be determined by measuring the pressure of the substantially liquid component comprising filtrate withdrawn from the filter column 301. Additionally, fluids flow from the area of high pressure to the area of low pressure. Thus, the flow of the substantially liquid component portion of the solid-liquid stream through filter 309 indicates a pressure differential between the area of higher pressure and the area of lower pressure across the filter 309.

At or near the closed end 303 of the substantially hollow cavity 302, it is preferred that there is at least one solid-liquid stream inlet 311 to direct a solid-liquid stream into the substantially hollow cavity 302. Filter column 301 further may comprise at least one immiscible fluid inlet line 312 to direct an immiscible fluid preferably into the substantially hollow cavity 302. Such an immiscible fluid is used to displace the substantially liquid component from the solid-liquid stream, or to form a blanket within at least a portion of substantially hollow cavity 302. Filter column 301 may further comprise at least one line to direct a flush feed 313 into said substantially hollow cavity 302 to clear any obstructions such as packed, substantially solid component lodged in the substantially hollow cavity 302. The flush feed functions in the same manner as described for FIG. 1.

Filter column 301 is in substantial cooperation with chute 310. Chute 310 contains therein a reslurry zone RZ3. Chute 310 may further comprise a straining means to assist with the reslurry of the substantially solid component with the flush feed 313.

An enriched product stream comprising the substantially solid component is separated in and directed from the filtration zone, FZ3, into the reslurry zone RZ3. At this point, the enriched product stream comprising the substantially solid component is in the form of a relatively dry cake when utilizing a gaseous immiscible fluid. The enriched product stream comprising the substantially solid component is reslurried with flush feed 313. The slurry mix of flush feed 313 and the enriched product stream comprising the substantially solid component in reslurry zone RZ3 may optionally be agitated. The reslurry zone RZ3 preferably has a liquid level, as depicted in FIG. 3, to prevent and seal against the escape of immiscible fluid out of the reslurry zone along with effluent stream 314, which comprises a mixture of flush feed 313 and the enriched product stream comprising the substantially solid component. Optionally, a heat source, in lieu of the flush feed 313, may be incorporated into the reslurry zone to melt at least a portion of the enriched product stream comprising the substantially solid component.

The reslurry zone RZ3 is operated at a sufficiently high temperature so that the resulting effluent stream 314 from the reslurry zone can be sent to one or more solid-liquid separation devices (not shown) that are capable of producing more enriched substantially solid component, which is further processed using conventional techniques to eventually recover a purified, paraxylene product. Such a purified paraxylene product comprises at least about 99 weight percent paraxylene, more preferably at least about 99.5 weight percent paraxylene, and yet more preferably at least about 99.7 weight percent paraxylene.

Such solid-liquid separation devices are well-known in the art, and include, but are not limited to, solid bowl, screen bowl or pusher type centrifuges and combinations thereof, wash columns, or rotary filters. Alternatively, the effluent stream 314 could be sent to another filter column.

These aforementioned apparatus embodiments allow for the efficient processing of any of the previously described solid-liquid streams. Thus, this invention also provides for the process of separating at least a portion of the substantially solid component from a solid-liquid stream comprising the substantially solid component and at least one substantially liquid component, which is described in more detail below.

The solid-liquid stream can be conveyed into any of the filter column apparatuses previously described at a pressure sufficient to separate at least a portion of the substantially solid component from the substantially liquid component. During this separation, at least a portion of the solid-liquid stream and/or at least a portion of the substantially solid component is contacted with an immiscible fluid. Preferably, said contacting of said solid-liquid stream and immiscible fluid occurs substantially in an area of higher concentration of said substantially solid component (higher concentration zone), or alternatively, in an area of higher pressure (higher pressure zone). In addition, the contacting of said solid-liquid stream and immiscible fluid occur in a substantially countercurrent flow. The immiscible fluid is used to separate at least a portion of the substantially liquid component from the substantially solid component through a filter communicating with the filter tubes previously described. At least a portion of the immiscible fluid may blanket at least a portion of the substantially hollow cavity, filtration zone, or reslurry zone, either individually, or in combinations thereof.

A substantial portion of the substantially liquid component and at least a portion of the immiscible fluid are removed through the filter as a filtrate, thus leaving a remaining enriched product stream comprising the substantially solid component. Preferably after this separation, or possibly concurrently with this separation, at least a portion of this enriched product stream comprising the substantially solid component is directed out of the filtration zone and into the reslurry zone. In the reslurry zone, at least a portion of the enriched product stream comprising the substantially solid component is reslurried with a flush feed, and subsequently processed and recovered as a purified product. Preferably, the purified product comprises paraxylene, preferably at least about 99 weight percent paraxylene, more preferably at least about 99.5 weight percent paraxylene, and yet more preferably at least about 99.7 weight percent paraxylene.

The immiscible fluid utilized in of any of the embodiments described herein is conveyed into any of the filter column apparatuses at an opposing pressure sufficient to facilitate the separation of at least a portion of the substantially solid component from the substantially liquid component, and for at least a portion of the immiscible fluid to pass through the filter to the interior of the filter tube.

Within the filter column, the highest imparted pressure is generally at the solid-liquid stream inlet. The lowest imparted pressure is generally at the filter of the filter column at the interior of the filter tube. The pressure at the immiscible fluid inlet is at an intermediate level. Since fluids flow in the direction of high pressure to low pressure, this ensures that the solid-liquid stream in the filter column moves towards the filter and at least a portion of the immiscible fluid.

Generally, when solid components are suspended in liquid, they move in the same direction as the nearby liquid. For embodiments of this invention, at least a portion of the liquid passes through the filter, resulting in at least a portion of the substantially solid component moving along with the substantially liquid component and depositing. This deposition forms a dense phase of substantially solid components. This dense phase may also comprise a substantially solids containing packed bed, further defined by interstitial bed void space. Such a substantially solids containing packed bed is located at, around, or in substantial proximity to, and is in substantial cooperation with, the filter. This packed bed may extend below or above the filter.

For the purposes of the present invention, the dense phase can describe an area of substantially solid component concentration within the substantially hollow cavity (or higher pressure zone or higher concentration zone) having a greater concentration of the substantially solid component than the solid-liquid stream. The dense phase may also describe a substantially solids containing packed bed wherein is the substantially solid component is of such concentration that the substantially solid component moves essentially as a solid body within the filter column.

When the substantially solid component is deposited as a substantially solids containing packed bed, the substantially solid component generally moves in the same direction as the substantially solids containing packed bed, as opposed to the direction of immiscible fluid flow towards the filter. However, some substantially solid component may move and be directed out from the substantially solids containing packed bed as the exiting substantially liquid component passes through the interstitial bed void space and through the openings in the filter. Nevertheless, the substantially solids containing packed bed moves essentially as a solid body and in a substantially constant direction, although its position in the filter column may remain substantially constant at a steady state.

The direction that the substantially solids containing packed bed moves, or whether the bed moves at all, is generally determined by the summation of all forces that act on the substantially solids containing packed bed. One force that is imparted on the substantially solids containing packed bed is from the substantially liquid component in the solid-liquid stream that flows through the packed bed on the way to the filter. An opposing force is imparted on the substantially solids containing packed bed from immiscible fluid blanketing the packed bed and/or flowing to the filter from the opposite end of the filter column. For purposes of the present invention, the immiscible fluid provides hydraulic force if the immiscible fluid is a liquid or pneumatic force if the immiscible fluid is a gas. Therefore, the substantially solids containing packed bed can be pushed by forces from both ends. The substantially solids containing packed bed will move in the desired direction if the force imparted by the substantially liquid component in the solid-liquid stream is equal to or larger than the sum of all the opposing forces. In addition, the opposing forces may also include the frictional forces imparted on the substantially solids containing packed bed that act to impede movement of the substantially solids containing packed bed and the force of gravity.

Referring again to the figures, these process steps are now described in more detail. The solid-liquid stream is conveyed near the substantially closed end 103, 203, or 303 of the substantially hollow cavity 102, 202, or 302 of the filter column 101, 201, or 301 via solid-liquid stream inlets 111, 211, or 311. The solid-liquid stream flows through the substantially hollow cavity 102, 202, or 302 towards the substantially open end 104, 204, or 304 of the substantially hollow cavity 102, 202, or 302. The immiscible fluid is directed into the substantially hollow cavity 102, 202, or 302 via immiscible fluid inlets 112, 212, or 312. The immiscible fluid flows in a substantially countercurrent manner to the flow of the solid-liquid stream in the substantially hollow cavity 102, 202, or 302, or can blanket the packed bed with little or no countercurrent flow where the packed bed is sufficiently high above the filter. To the extent that the solid-liquid stream flows along the filter 109, 209, or 309, a substantial portion of the substantially liquid component passes through the filter 109, 209, or 309 as a filtrate and into the interior of the filter tube 105, 205, or 305. Optionally, a portion of this substantially liquid component may be recycled back to the solid-liquid stream. This filtrate exits the filter column 101, 201, or 301, via the bottom portion 107, 207, or 307 of at least one filter tube 105, 205, or 305. Substantially in conjunction with the substantially liquid component passage, at least a portion of the immiscible fluid passes through filter 109, 209, or 309 into the interior of filter tubes 105, 205, or 305 and exits the filter column 101, 201, or 301 via the bottom portion 107, 207, or 307 of filter tube 105, 205, or 305. Alternatively, at least a portion of the immiscible fluid may blanket the substantially solids containing packed bed without passing through the filter.

The filtrate exiting the filter column 101, 201, or 301 primarily comprises the substantially liquid component, but may contain small amounts of the substantially solid component from the solid-liquid stream. The amount of the substantially solid component present in the filtrate may be affected by such factors including, but not limited to, the type of the filter employed in the filter column, the size of the openings in the filter, and the type of solid-liquid stream injected into the filter column. However, it is preferred that the filtrate comprise no more than about 20 weight percent solids, more preferably no more than about 10 weight percent solids, even more preferably no more than about 5 weight percent solids, and most preferably no more than about 1 weight percent solids for best results. The balance of the filtrate is the substantially liquid component. In the case of separating crystallized paraxylene from a solid-liquid stream, the filtrate may comprise orthoxylene, metaxylene, ethylbenzene, paraxylene, and other hydrocarbons such as paraffins, naphthenes, benzene, and toluene.

As the substantially liquid component passes through the filter 109, 209, or 309 as a filtrate, a dense phase of substantially solid components forms within the substantially hollow cavity 102, 202, or 302. In the case of separating crystallized paraxylene from a solid-liquid stream, the substantially solid component comprises paraxylene, and optionally comprises orthoxylene, metaxylene, ethylbenzene, paraffins, naphthenes, benzene, and toluene. Preferably, the dense phase comprises a substantially solids containing packed bed within the substantially hollow cavity 102, 202, or 302 of the filter column 101, 201, or 301 at, near, or in substantial proximity to filter tube 105, 205, or 305. During this formation, a portion of the substantially liquid component and at least a portion of the immiscible fluid is removed through the filter, thus leaving a remaining enriched product stream comprising the substantially solid component. Alternatively, at least a portion of the immiscible fluid may blanket the substantially solids containing packed without passing through the filter. Preferably after this separation, or possibly concurrently with this separation, this enriched product stream comprising the substantially solid component is directed out of the filtration zones, FZ1, FZ2, or FZ3, and into the reslurry zones RZ1, RZ2, or RZ3 per the embodiments described. In FIG. 1, the enriched product stream comprising the substantially solid component is directed toward reslurry zone RZ1 along the substantially curved section 108a of inner wall 108. In FIG. 2, the enriched product stream comprising the substantially solid component is directed to deflector 210, which deflects the enriched product stream comprising the substantially solid component towards reslurry zone RZ2. In FIG. 3, the enriched product stream comprising the substantially solids component is directed into chute 310 and then into reslurry zone RZ3.

The enriched product stream comprising the substantially solid component exiting from filtration zones FZ1, FZ2 or FZ3 primarily comprises the substantially solid component from the solid-liquid stream, but may comprise small amounts of the substantially liquid component and immiscible fluid. The amount of the substantially liquid component present in the enriched product stream comprising the substantially solid component may be affected by such factors including, but not limited to, the type and size of the substantially solid component in the solid-liquid stream, the size of the pores in the filter, the flow rate of the solid-liquid stream injected into the filter column, and the type and flow rate of the immiscible fluid. However, it is preferred that the enriched product stream comprising the substantially solid component comprise less than about 40 weight percent of the substantially liquid component, preferably less than about 35 weight percent of the substantially liquid component, more preferably less than about 30 weight percent of the substantially liquid component, even more preferably less than about 25 weight percent of the substantially liquid component, even more preferably less than about 20 weight percent of the substantially liquid component, even more preferably less than about 15 weight percent of the substantially liquid component, even more preferably less than about 10 weight percent of the substantially liquid component, and most preferably less than about 5 weight percent of the substantially liquid component for best results.

In addition, the present invention is directed to maintaining a dense phase comprising a substantially solids containing packed bed throughout the solid-liquid separation process, by maintaining the higher pressure zone at a temperature lower than the melting point of at least one substantially solid component in the solid-liquid stream. For the purposes of the present invention, the temperature of the higher pressure zone can be determined by determining the temperature of the enriched product stream comprising the substantially solid component removed from the filter column. Alternatively, the temperature can be determined by placing temperature indicators in strategic locations within the higher pressure zone.

FIGS. 4a-d further provide a stepwise depiction of the start-up of the separation process of this present invention, which provides for the formation of a substantially solids containing packed bed within the substantially hollow cavity 102, 202, or 302 of the filter column 101, 201, or 301. In this embodiment, as shown in FIG. 4a, the solid-liquid stream initially enters near the closed end 103, 203, or 303 of the substantially hollow cavity 102, 202, or 302 through one or more solid-liquid stream inlets (not shown) and the immiscible fluid (not shown) initially enters the open end 104, 204, or 304 of the substantially hollow cavity. The immiscible fluid initially enters the substantially hollow cavity 102, 202, or 302 at a pressure sufficient for at least a portion of the immiscible fluid to pass through at least one filter 109, 209, or 309 to the lower pressure zone. The solid-liquid stream moves towards the substantially open end of the substantially hollow cavity 102, 202, or 302 by crossing at least one filter 109, 209, or 309 wherein at least a portion of the substantially liquid component of the solid-liquid passes through at least one filter 109, 209, or 309 forming a filtrate that exits the filter column through a bottom portion 107, 207, or 307 of the filter tube 105, 205, or 305 that extends through the closed end of the filter column. The opposing pressure of the immiscible fluid preferably prevents the solid-liquid stream from completely crossing the filter 109, 209, or 309 on its way towards the open end 104, 204, or 304 of the substantially hollow cavity 102, 202, or 302.

Referring now to FIG. 4b, as the substantially liquid component of the solid-liquid stream passes through the filter 109, 209, or 309, the substantially solid component begins to form a substantially solids containing packed bed 415 within the substantially hollow cavity 102, 202, or 302. As the substantially solid component accumulates, the substantially solids containing packed bed increases in size, and may fill the entire section between the filter and the wall, as shown in FIG. 4c. Substantially solids containing packed bed 415 depicts the portion of the substantially solids containing packed bed wherein mainly liquid flows towards the filter, while substantially solids containing packed bed 416 depicts the portion of the dense phase wherein the immiscible fluid flows towards the filter. Once the substantially solid containing packed bed 415 and 416 is formed, the pressure imparted by the solid-liquid stream is generally greater than the pressure exerted by the immiscible fluid. As a result, as shown in FIG. 4c, at least a portion of the substantially solids containing packed bed 415 and 416 moves towards the substantially open end 104, 204, or 304 of the substantially hollow cavity 102, 202, or 302. When the separation process reaches steady-state, the amount of substantially solids containing packed bed leaving the top of the filter column 101, 201, or 301, is equal to the deposition rate of solids at the bottom of the substantially solids containing packed bed. This is shown in FIG. 4d.

The present invention provides for efficient separation of crystallized products, such as paraxylene, from a solid-liquid stream at relatively low temperatures without risk and attendant penalties associated with freezing a wash liquid within the filter column and causing complete failure of the solid-liquid separation process.

The present invention also provides for a substantial reduction in capital expenditure and routine maintenance by reducing the number of moving parts required by solid-liquid separation process units, such as screen bowl and pusher centrifuges. The filter column, according to the present invention, can comprise little or no moving parts, substantially reducing the routine maintenance costs associated with conventional solid-liquid separation units.

The present invention also provides for substantial savings in refrigeration costs by allowing for solid-liquid separation of crystallization products under substantially isothermal conditions. Current solid-liquid processes, such as screen bowl centrifuges, add considerable amounts of energy to the process stream thereby raising the temperature of the effluent streams. In a paraxylene crystallization process, for example, this energy added to the process requires increased refrigeration costs.

The present invention also provides for a substantial cost savings by reducing the amount of solids lost in filtrate streams frequently found in conventional solid-liquid separation processes and apparatuses.

The present invention also provides for the separation of substantially liquid components from substantially solids components in a filter column at temperatures far below the melting point of crystals in slurries derived from a crystallization process that can be operated in a continuous manner without high loss of the crystals to the liquid filtrate through one or more filters during the separation process.

The present invention also provides for the use of filter columns to debottleneck existing paraxylene units that already have centrifuges. By adding filter columns and wash columns to an existing unit, it is possible to increase the solids/liquid separation capacity while also lowering the refrigeration requirement per pound of paraxylene product. Therefore, for existing units that have a refrigeration bottleneck or are limited by the capacity of the solids/liquid separation equipment, the proper installation of filter columns will provide a cost effective debottleneck.

The present invention also provides for filter columns to reduce feedstock losses to less valuable by-products by recovering more paraxylene from the cold end solid liquid stream, thereby reducing the amount of paraxylene recycled to the isomerization reactor.

This invention has been described for the purposes of illustration only in connection with certain embodiments. However, it is recognized that various changes, additions, improvements, and modifications to the illustrated embodiments may be made by those persons skilled in the art, all falling within the scope and spirit of the invention.

EXAMPLES

The following examples are presented to illustrate a process for the recovery and purification of paraxylene substantially in accordance with the present invention and FIG. 3. The following parameters were measured or calculated from measured variables. (1) the weight percent of paraxylene in the solid-liquid stream; (2) the weight percent of solids in the solid-liquid stream; (3) the temperature of the solid-liquid stream; (4) the weight percent of paraxylene in the filtrate; (5) the weight percent of solids in the filtrate; (6) the temperature of the filtrate; (7) the weight percent of paraxylene in the cake; (8) the weight percent of liquid in the cake; and (9) the temperature of the cake. The temperature of the cake was not measured for the third example.

Examples 1 and 2 utilized a filter column having an inside diameter of 6 inches. The column contained a single filter tube approximately 29 inches in length. The outside diameter of the filter tube was 2.375 inches. The filter tube comprised a filter screen fabricated with a 316 stainless steel CONIDUR® screen bought from Hein, Lehmann measuring 6.4 inches in length. The top of the screen was located 5 inches from the top of the filter tube and comprised 0.1 mm by 3 mm slits. The overall open area of the screen was 9 percent.

For Example 1, the 6-inch diameter filter column was fed 1500 lb/hr of a solid-liquid stream comprising mixed xylenes from a commercial, low temperature crystallizer. The pressure of the solid-liquid stream comprising mixed xylenes entering the filter column was approximately 160 psia for this 30-hour test. Gaseous nitrogen was used as the immiscible fluid. The temperature of the nitrogen was not controlled and therefore varied with ambient temperature. The feed rate of the nitrogen was 24 lb/hr and the inlet pressure was approximately 63 psia. Five sets of samples were removed during the 30-hour test, yielding the results shown in Table 1.

TABLE 1

6" Filter Column with 1500 lb/hr Solid-liquid stream and 24 lb/hr Nitrogen

| | Sample | | | | |
|---|---|---|---|---|---|
| | 032-1 | 032-2 | 032-3 | 032-4 | 032-5 |
| | Hours from Startup | | | | |
| | 3 | 6 | 20 | 24 | 30 |
| Solid-liquid stream | | | | | |
| Wt % pX | 25.9 | 26.0 | 25.8 | 26.4 | 26.3 |
| Wt % solids | 16.7 | 17.0 | 17.2 | 17.9 | 17.8 |
| Temperature, ° F. | −71.0 | −72.1 | −74.5 | −74.3 | −74.4 |
| Filtrate | | | | | |
| Wt % pX | 11.1 | 10.8 | 10.7 | 10.3 | 10.4 |
| Wt % solids | 0.0 | 0.0 | 0.5 | 0.0 | 0.0 |
| Temperature, ° F. | −70.0 | −70.5 | −72.8 | −72.8 | −72.6 |
| Cake | | | | | |
| Wt % pX | 87.2 | 85.5 | 85.4 | 85.7 | 86.5 |
| Wt % liquid | 14.4 | 16.2 | 16.3 | 16.0 | 15.0 |
| Temperature, ° F. | −68.0 | −69.6 | −57.1 | −57.2 | −54.8 |
| Nitrogen Supply | | | | | |
| Temperature, ° F. | 82.2 | 82.5 | 73.4 | 81.0 | 86.9 |

For Example 2, the 6-inch diameter filter column was fed 1000 lb/hr of a solid-liquid stream comprising mixed xylenes from a commercial, low temperature crystallizer. The pressure of the solid-liquid stream comprising mixed xylenes entering the filter column was approximately 155 psia for this 54-hour test. Gaseous nitrogen was used as the immiscible fluid. The temperature of the nitrogen was not controlled and therefore varied with ambient temperature. The feed rate of the nitrogen was 20 lb/hr and the inlet pressure was approximately 59 psia. Six sets of samples were removed during the 54-hour test, yielding the results shown in Table 2.

TABLE 2

6" Filter Column with 1000 lb/hr Solid-liquid stream and 20 lb/hr Nitrogen

| | Sample | | | | | |
|---|---|---|---|---|---|---|
| | 034-1 | 034-2 | 034-3 | 034-4 | 034-5 | 034-6 |
| | Hours from Startup | | | | | |
| | 3 | 6 | 21 | 30 | 45 | 53 |
| Solid-liquid stream | | | | | | |
| Wt % pX | 23.9 | 24.0 | 24.8 | 26.3 | 26.6 | 26.6 |
| Wt % solids | 15.4 | 15.3 | 16.5 | 17.7 | 18.6 | 18.5 |
| Temperature, ° F. | −75.7 | −75.0 | −76.1 | −73.8 | −76.6 | −76.1 |
| Filtrate | | | | | | |
| Wt % pX | 10.3 | 10.3 | 10.4 | 10.6 | 10.5 | 10.1 |
| Wt % solids | 0.2 | 0.1 | 0.5 | 0.1 | 0.7 | 0.2 |
| Temperature, ° F. | −73.7 | −73.0 | −73.9 | −71.9 | −74.5 | −73.9 |
| Cake | | | | | | |
| Wt % pX | 86.9 | 86.0 | 85.7 | 86.9 | 86.8 | 86.1 |
| Wt % liquid | 14.5 | 15.6 | 15.9 | 14.6 | 14.7 | 15.4 |
| Temperature, ° F. | −72.1 | −71.9 | −69.5 | −68.3 | −68.7 | −70.6 |
| Nitrogen Supply | | | | | | |
| Temperature, ° F. | 85.9 | 87.2 | 71.3 | 88.6 | 66.3 | 78.0 |

The third example utilized a filter column having an inside diameter of 22.6 inches. The column contained 19 filter tubes approximately 48 inches in length. These filter tubes were fabricated in the same manner as the filter tube installed in the 6-inch filter column as discussed above.

For Example 3, the filter column was fed 10,000 lb/hr of a solid-liquid stream comprising mixed xylenes from a commercial, low temperature crystallizer. The pressure of the solid-liquid stream comprising mixed xylenes entering the filter column was approximately 90 psia for the first 30 hours of the test when the first three sets of samples were removed. The conditions of the crystallizer from which the solid-liquid stream was obtained were then changed. After waiting about 20 hours to allow the system to reach steady-state, three more sets of samples were removed over a 6 hour period. The pressure of the solid-liquid stream comprising mixed xylenes feed entering the filter column was approximately 117 psia for these last sets of samples. Gaseous nitrogen was used as the immiscible fluid. The temperature of the nitrogen was not controlled and therefore varied with ambient temperature. The feed rate of the nitrogen was 150 lb/hr and the inlet pressure was approximately 57 psia for the first 30 hours and approximately 72 psia for the last three sets of samples. In all, six sets of samples were removed during the test, yielding the results shown in Table 3.

TABLE 3

22.6" Filter Column with 10,000 lb/hr Solid-liquid stream and 150 lb/hr Nitrogen

| | Sample | | | | | |
|---|---|---|---|---|---|---|
| | 006-1 | 006-2 | 006-3 | 006-4 | 006-5 | 006-6 |
| | Hours from Startup | | | | | |
| | 5 | 24 | 27 | 45 | 48 | 51 |
| Solid-liquid stream | | | | | | |
| Wt % pX | 26.1 | 26.0 | 26.2 | 23.6 | 23.5 | 23.6 |
| Wt % solids | 17.8 | 18.0 | 18.5 | 15.3 | 15.1 | 14.9 |
| Temperature, °F. | −75.5 | −77.2 | −78.3 | −76.8 | −76.4 | −74.8 |
| Filtrate | | | | | | |
| Wt % pX | 9.8 | 9.6 | 9.2 | 9.8 | 9.9 | 10.1 |
| Wt % solids | 0.0 | 0.0 | 0.0 | 0.0 | 0.0 | 0.0 |
| Temperature, °F. | −74.3 | −76.3 | −77.4 | −75.2 | −75.3 | −73.8 |
| Cake | | | | | | |
| Wt % pX | 83.5 | 84.3 | 86.5 | 85.1 | 86.0 | 85.7 |
| Wt % liquid | 18.3 | 17.4 | 15.0 | 16.5 | 15.5 | 16.0 |
| Temperature, °F. | Not measured | | | | | |
| Nitrogen Supply | | | | | | |
| Temperature, °F. | 55.9 | 49.2 | 56.2 | 44.1 | 49.7 | 54.3 |

For Example 4, the 6 inch filter column was fed a mixed xylenes stream from a commercial slurry drum operating at about 25° F. The filter column was operated over a wide range of process conditions. Gaseous nitrogen was used as the immiscible fluid. The temperature of the nitrogen was not controlled and therefore varied with ambient temperature. Ten sets of samples were removed during this fifty-hour test yielding the results shown in Table 4.

and immiscible fluid rates. In all cases presented in the tables, very little solids were observed in the filtrate. The paraxylene in the filtrate was primarily derived from the liquid paraxylene present in the solid-liquid stream. In general, the filtrate temperature was only about 1 to 2° F. warmer than the solid-liquid stream despite the fact the temperature of the nitrogen supply was 120 to 160° F. warmer than the solid-liquid stream. Keeping the filtrate temperature close to the solid-liquid stream temperature provides savings in refrigeration costs. It is possible for the temperature of the cake near the top of the filter column to be substantially warmer than the solid-liquid stream and yet still observe a filtrate temperature close to the temperature of the solid-liquid stream. This is illustrated in Table 1. It is also possible to operate the invention so that the cake near the top of the filter column is much closer to the temperature of the solid-liquid stream as shown in Table 2. Finally, changes in the operation of the upstream crystallizer can affect the required inlet pressures to the filter column but leave the overall sample results substantially unaffected. This is shown in Table 3.

The data in Table 4 can be grouped in several ways to demonstrate the changes in filter column performance to changes in process conditions. The first four sets of samples were taken at substantially the same feed conditions but at various immiscible gas rates. The column pressures increase with gas rate. At 2.5 lb/hr of gas, the solid-liquid feed pressure is 72 psig and the inlet gas pressure is 32 psig. At 6.5 lb/hr of gas, these pressures are 91 and 35 psig, respectively. The cake samples indicate that wetter cake is obtained at lower gas rates. A different grouping of the data presented in Table 4 demonstrates the effect of varying solid-liquid feed rates holding the other variables substantially constant. This comparison involves samples 025-1 and 025-4 through 025-7. Finally, the last grouping involves samples 025-1, 025-4, and

TABLE 4

6" Filter Column with Warm Solid-Liquid Stream

| | Sample | | | | | | | | | |
|---|---|---|---|---|---|---|---|---|---|---|
| | 025-1 | 025-2 | 025-3 | 025-4 | 025-5 | 025-6 | 025-7 | 025-8 | 025-9 | 025.10 |
| | Hours from Startup | | | | | | | | | |
| | 3 | 5 | 7 | 22 | 25 | 28 | 31 | 46 | 48 | 50 |
| Solid-liquid stream | | | | | | | | | | |
| Rate, lb/hr | 3500 | 3500 | 3500 | 3500 | 2500 | 3000 | 3950 | 3225 | 2851 | 2950 |
| Wt % pX | 78.0 | 76.3 | 76.1 | 77.2 | 77.6 | 78.8 | 77.5 | 73.8 | 69.2 | 70.4 |
| Wt % solids | 41.1 | 34.4 | 35.6 | 40.6 | 41.0 | 40.2 | 40.0 | 29.0 | 13.9 | 18.4 |
| Temperature, °F. | 23.8 | 24.0 | 23.4 | 23.7 | 23.2 | 25.7 | 24.7 | 24.0 | 25.8 | 24.9 |
| Pressure, psig | 89 | 91 | 72 | 84 | 88 | 82 | 80 | 68 | 51 | 56 |
| Filtrate | | | | | | | | | | |
| Wt % pX | 63.0 | 64.5 | 62.7 | 61.2 | 62.0 | 63.9 | 62.1 | 63.5 | 64.6 | 64.2 |
| Wt % solids | 1.0 | 1.6 | 0.0 | 0.0 | 0.0 | 0.0 | 0.0 | 1.0 | 1.2 | 1.2 |
| Temperature, °F. | 25.8 | 24.7 | 22.7 | 23.1 | 22.7 | 25.0 | 23.9 | 23.6 | 25.4 | 24.6 |
| Wt % pX | 92.9 | 93.5 | 92.5 | 92.4 | 93.7 | 93.1 | 92.4 | 92.9 | 94.5 | 93.6 |
| Wt % liquid | 19.0 | 17.9 | 20.2 | 19.8 | 16.5 | 19.6 | 20.2 | 19.1 | 15.3 | 17.7 |
| Temperature, °F. | 23.6 | 23.6 | 23.3 | 23.2 | 22.7 | 25.0 | 24.3 | 23.8 | 25.1 | 24.4 |
| Nitrogen Supply | | | | | | | | | | |
| Rate, lb/hr | 4.5 | 6.5 | 2.5 | 4.5 | 4.5 | 4.5 | 4.5 | 4.5 | 4.5 | 4.5 |
| Temperature, °F. | 76.1 | 78.6 | 80.3 | 75.9 | 80.1 | 85.4 | 86.1 | 78.1 | 78.2 | 82.6 |
| Pressure, psig | 35 | 35 | 32 | 34 | 33 | 32 | 34 | 31 | 28 | 29 |

These four examples illustrate a number of important points. This invention can be built at various sizes and can operate successfully with a variety of solid-liquid stream rates 025-8 through 025-10 in which the intent was to demonstrate the effect of varying the solids content of the feed holding all other variables substantially constant. These results, particularly when combined with the results presented in Tables 1 and 2 wherein the same equipment was used to obtain data at significantly different conditions, clearly demonstrate that this invention can operate successfully over a wide range of operating conditions.

That which is claimed:

1. A process for separating at least a portion of one or more substantially solid components from a solid-liquid stream comprising said one or more substantially solid components and one or more substantially liquid components, said process comprising:
   a. contacting an immiscible fluid with one or both of at least a portion of said solid-liquid stream, or at least a portion of said one or more substantially solid components;
   b. passing at least a portion of said one or more substantially liquid components and at least a portion of said immiscible fluid through at least one filter in a filter zone and forming a filtrate comprising said substantially liquid component and said immiscible fluid, thus leaving an enriched product stream comprising said one or more substantially solid components; and
   c. passing the enriched product stream to a substantially enclosed reslurry zone, wherein the filter zone and the reslurry zone are separated by a barrier wall.

2. The process of claim 1 wherein said contacting and passing steps substantially occur in a filtration zone comprising said at least one filter, an area of higher concentration of said one or more substantially solid components, an area of lower concentration of said one or more substantially solid components.

3. The process of claim 2 wherein said area of higher concentration of said one or more substantially solid components is located around or outside of said at least one filter, and wherein said area of lower concentration of said one or more substantially solid components is located within or inside of said at least one filter.

4. The process of claim 2 wherein said contacting step occurs substantially in said area of higher concentration of said one or more substantially solid components.

5. The process of claim 1 wherein said contacting of step a occurs in a substantially countercurrent flow.

6. The process of claim 1 wherein said contacting and passing steps substantially occur in a filtration zone comprising said at least one filter, a higher pressure zone, an a lower pressure zone.

7. The process of claim 6 wherein said higher pressure zone is located around or outside of said at least one filter, and wherein said lower pressure zone is located within or inside of said at least one filter.

8. The process of claim 7 wherein said higher pressure zone is maintained at a temperature lower than the melting point of said one or more substantially solid components in said solid-liquid stream.

9. The process of claim 6 wherein said contacting step occurs in said higher pressure zone.

10. The process of claim 1, wherein said solid-liquid stream comprises at least one hydrocarbon selected from the group consisting of ethylbenzene, paraxylene, metaxylene, orthoxylene, benzene, toluene, paraffins, and naphthenes, or combinations thereof.

11. The process of claim 1 wherein at least a portion of said solid-liquid stream is the direct or indirect product or byproduct of a toluene disproportionation process.

12. The process of claim 1 wherein at least a portion of said solid-liquid stream is the direct or indirect product or byproduct of a crystallization process.

13. The process of claim 12 wherein said crystallization process comprises at least one slurry section.

14. The process of claim 1 wherein at least a portion of said solid-liquid stream is the direct or indirect product or byproduct of a molecular sieve adsorption process.

15. The process of claim 1 wherein said filtrate comprises at least one hydrocarbon selected from the group consisting of ethylbenzene, paraxylene, metaxylene, orthoxylene, benzene, toluene, paraffins, and naphthenes, or combinations thereof.

16. The process of claim 1, wherein said immiscible fluid is selected from the group consisting of nitrogen, carbon dioxide, hydrogen, compressed air, xenon, argon, neon, helium, methane, ethane, natural gas, and steam.

17. The process of claim 2 wherein said area of higher concentration of said one or more substantially solid components comprises a dense phase comprising a substantially packed bed of said one or more substantially solid components.

18. The process of claim 1, wherein at least a portion of said enriched product stream comprising said one or more substantially solid components is directed to a reslurry zone.

19. The process of claim 18 wherein at least a portion of said enriched product stream is reslurried with a flush feed in said reslurry zone.

20. The process of claim 1 wherein at least a portion of said one or more substantially liquid components is optionally recycled back to said solid-liquid stream.

21. The process of claim 1 wherein said solid-liquid stream comprises between about 0.5 weight percent to about 65 weight percent of said substantially solid components.

22. The process of claim 1 wherein said solid-liquid stream comprises between about 5 weight percent to about 60 weight percent of said substantially solid components.

23. The process of claim 1 wherein said solid-liquid stream comprises between about 10 weight percent to about 55 weight percent of said substantially solid components.

24. A packed bed process for separating at least a portion of at least one substantially solid component from a solid-liquid stream comprising said at least one substantially solid component and at least one substantially liquid component, said process comprising the steps of:
   a. applying an immiscible fluid for assisting formation of a substantially solids containing packed bed defining a bed void space; and
   b. passing at least a portion of said at least one substantially liquid component through said void space of said substantially solids containing packed bed, thus leaving an enriched product stream comprising said at least one substantially solid component;
   c. passing at least a portion of said at least one substantially liquid component through at least one filter in a filter zone; and
   d. directing said enriched product stream to a substantially enclosed reslurry zone, wherein the filter zone and the reslurry zone are separated by a barrier wall.

25. The process of claim 24 wherein the area around or outside of said at least one filter comprises a higher pressure zone.

26. The process of claim 24 wherein the area within or inside of said at least one filter comprises a lower pressure zone.

27. The process of claim 25 wherein said solid-liquid stream and said immiscible fluid are directed into said higher pressure zone.

28. The process of claim 24 wherein said immiscible fluid applies an opposing pressure to said substantially solids containing packed bed.

29. The process of claim 25, wherein said higher pressure zone is maintained at a temperature lower than the melting point of said at least one substantially solid component in said solid-liquid stream.

30. The process of claim 24 wherein at least a portion of said solid-liquid stream is the direct or indirect product or byproduct of a toluene disproportionation process.

31. The process of claim 24 wherein at least a portion of said solid-liquid stream is the direct or indirect product or byproduct of a crystallization process.

32. The process of claim 31 wherein said crystallization process comprises at least one slurry section.

33. The process of claim 24 wherein at least a portion of said solid-liquid stream is the direct or indirect product or byproduct of a molecular sieve adsorption process.

34. The process of claim 24 wherein said at least a portion of said substantially solids containing packed bed is in substantial cooperation with said at least one filter.

35. The process of claim 24 wherein at least a portion of said immiscible fluid passes through at least a portion of said substantially solids containing packed bed.

36. The process of claim 24 wherein at least a portion of said immiscible fluid passes through said at least one filter.

37. The process of claim 24 wherein at least a portion of said at least one substantially solid component of said solid-liquid stream forms a portion of said substantially solids containing packed bed.

38. The process of claim 24 wherein at least a portion of said substantially solids containing packed bed is removed as said enriched product stream comprising said at least one substantially solid component.

39. The process of claim 38 wherein at least a portion of said substantially solid component of said substantially solids containing packed bed moves in a substantially constant direction for displacement as said enriched product stream comprising said at least one substantially solid component.

40. The process of claim 24 wherein said immiscible fluid applies a pressure substantially opposing the direction of displacement of said substantially solids containing packed bed.

41. A start up process for forming a substantially solids containing packed bed, said process comprising:
 a. contacting a solid-liquid stream comprising at least one substantially solid component and at least one substantially liquid component with an immiscible fluid,
 b. directing at least a portion of said at least one substantially liquid component through at least one filter in a filter zone to form said substantially solids containing packed bed, wherein said bed further defines a bed void space;
 c. passing at least a portion of said at least one substantially liquid component through said bed void space of substantially solids containing packed bed thus leaving an enriched product stream comprising said at least one substantially solid component; and
 d. directing said enriched product stream to a substantially enclosed reslurry zone, wherein the filter zone and the reslurry zone are separated by a barrier wall.

42. The process of claim 41 wherein at least a portion of said immiscible fluid passes through at least a portion of said substantially solids containing packed bed.

43. The process of claim 41 wherein at least a portion of said immiscible fluid passes through said at least one filter.

44. The process of claim 41 wherein at least a portion of said at least one substantially solid component of said solid-liquid stream forms a portion of said substantially solids containing packed bed.

45. The process of claim 41 wherein said immiscible fluid applies a pressure substantially opposing the direction of displacement of said substantially solids containing packed bed.

* * * * *